July 6, 1943.  I. JACOEL  2,323,774
CABLE SPLICER
Filed Nov. 14, 1942  2 Sheets-Sheet 1
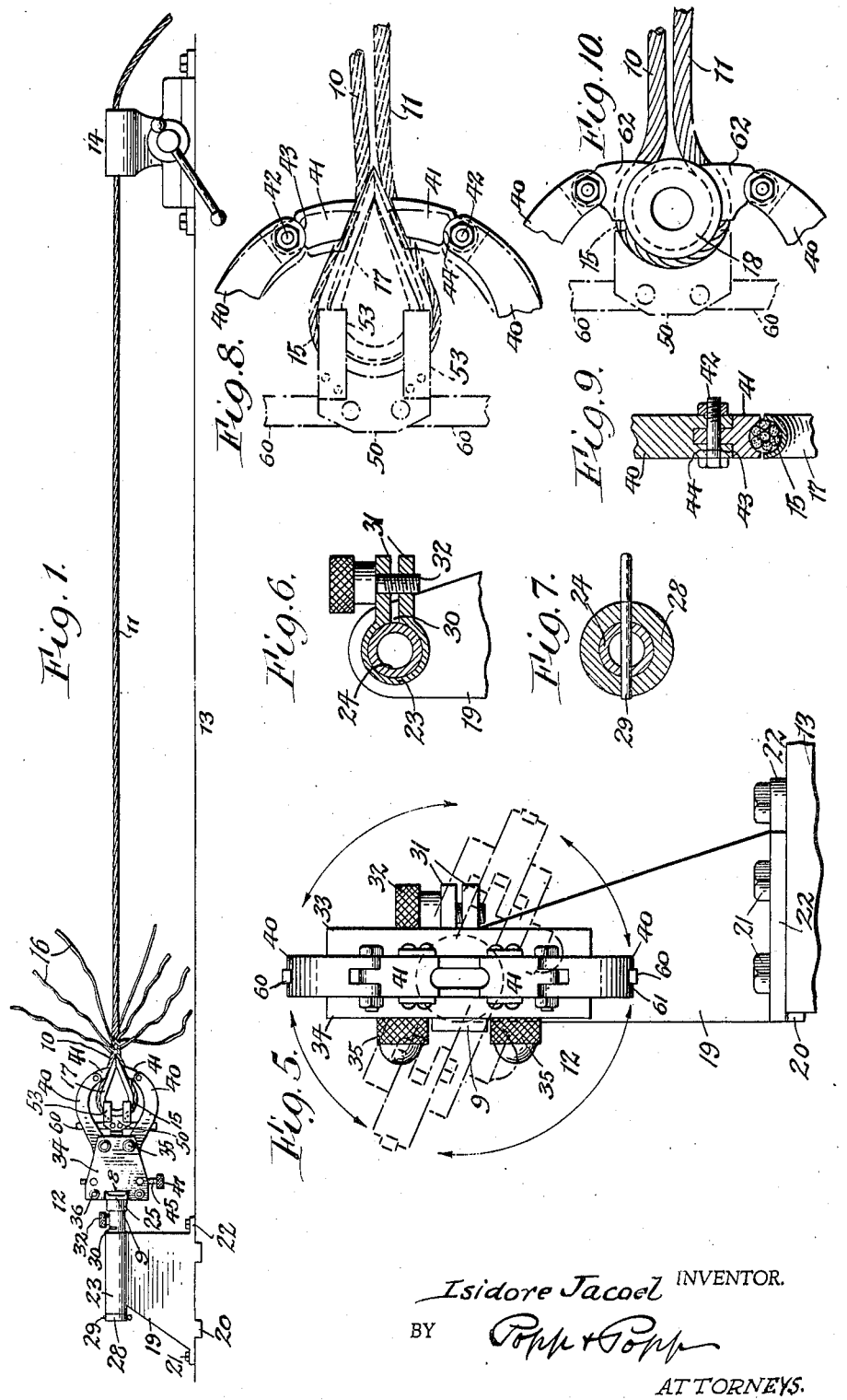
Isidore Jacoel INVENTOR.
BY Popp & Popp
ATTORNEYS.

July 6, 1943. I. JACOEL 2,323,774
CABLE SPLICER
Filed Nov. 14, 1942 2 Sheets-Sheet 2
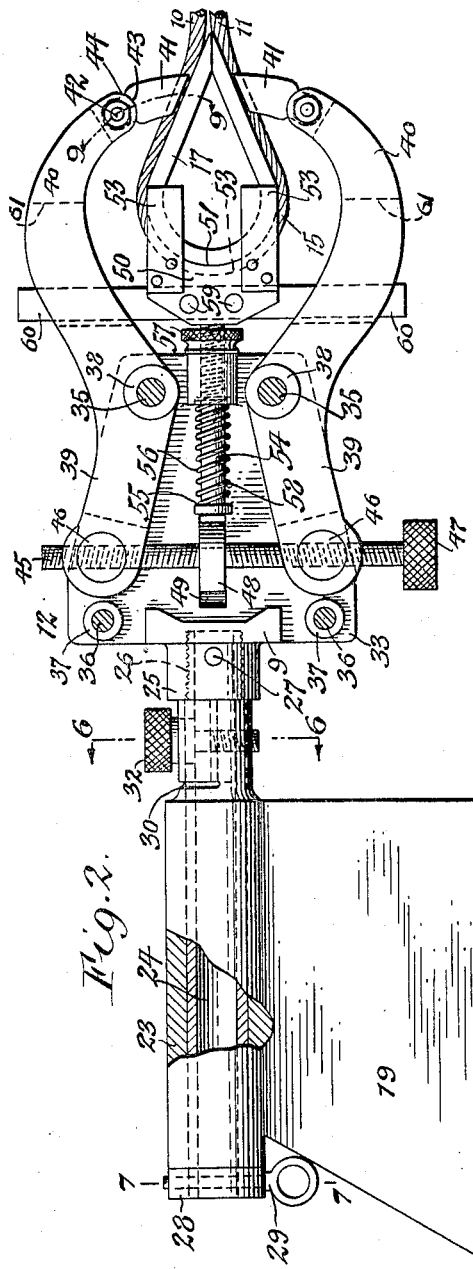
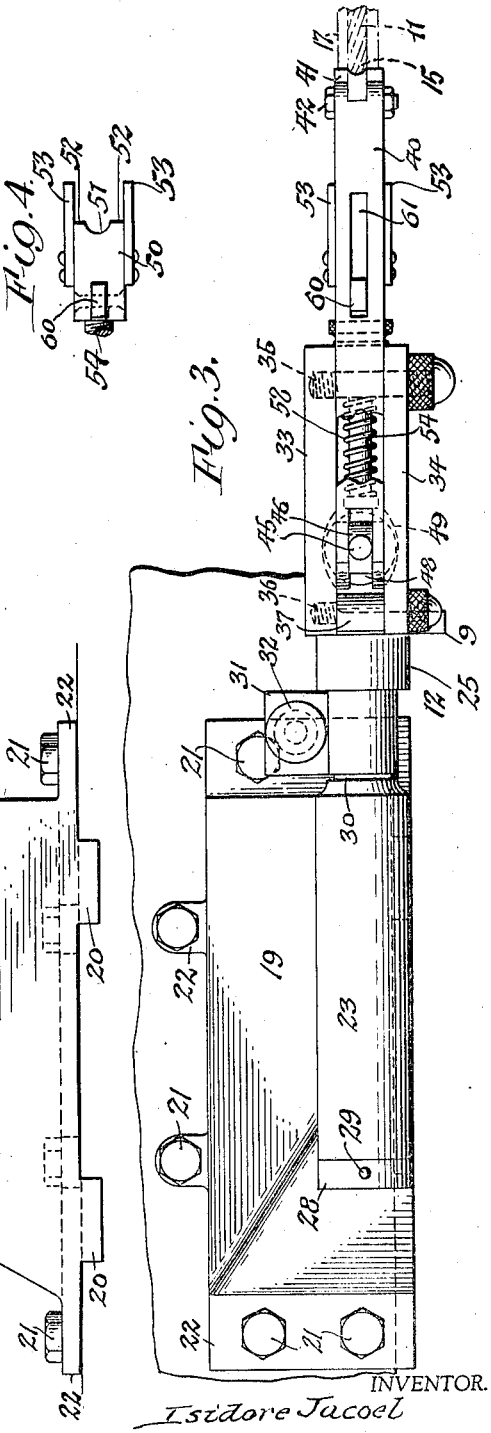
INVENTOR.
Isidore Jacoel
BY Popp & Popp
ATTORNEYS Patented July 6, 1943

2,323,774

UNITED STATES PATENT OFFICE 2,323,774

CABLE SPLICER

Isidore Jacoel, Buffalo, N. Y.

Application November 14, 1942, Serial No. 465,561

15 Claims. (Cl. 57—23)

This invention relates to a cable splicer which may be used advantageously for splicing cables for various purposes.

An apparatus of this character is shown and described in Letters Patent of the United States No. 2,028,610, granted to me January 21, 1936.

In using the cable splicer shown in this prior patent the means which gripped the cable rotated in a handle or bearing which was removably held by a vise and rotation of the gripping means was controlled by a clamping device so that the cable and gripping means could be held in any desired position during the splicing operation without interference from the torque in the cable when turning the same.

This manner of temporarily mounting the bearing of the cable gripping means on a vise has been found unsatisfactory when splicing a larger size of cable because it requires a sturdier mounting.

Instead of mounting the bearing for the cable gripping means temporarily on a vise the present invention contemplates the use of a stationary standard having a bearing in which the cable gripping device may be rotated as required while performing the splicing operation and which is also detachably mounted so that the cable grippings may be quickly and easily removed from the standard when it is desired to smoothen the splice of the cable by hammering.

One of the objects of this invention is to provide simple and efficient means whereby the cable gripping means may be thus rotatably held on a stationary standard.

Another object of this invention is to provide means whereby the cable gripping means may be quickly detached from the standard and reapplied thereto.

A further object of this invention is to improve the means whereby the cable is held by the gripping means and capable of being used for gripping cables and thimbles or bushings of various sizes and also to improve this apparatus in various details of construction.

In the accompanying drawings:

Fig. 1 is a side elevation, on a reduced scale, showing the manner in which this invention is used to splice a cable having a thimble.

Fig. 2 is a side elevation, on an enlarged scale and partly in section, of the cable and thimble gripping means and the standard upon which the same is rotatably and detachably mounted.

Fig. 3 is a top plan view of the same.

Fig. 4 is a fragmentary side view of the yoke which supports the loop or bight of the cable and the thimble therein during the operation of splicing the cable.

Fig. 5 is a front elevation of the apparatus corresponding to the position shown in Figs. 1, 2 and 3.

Figs. 6 and 7 are cross sections, taken on the correspondingly numbered lines in Fig. 2.

Fig. 8 is a diagrammatic plan view showing the manner of gripping cables and thimbles of different sizes.

Fig. 9 is a fragmentary cross section, taken on line 9—9, Fig. 2.

Fig. 10 is a fragmentary plan view showing modified means for gripping a bushing or spacer which has the form of a spool or cylindrical eye.

In the following description the same numerals indicate like parts in the several figures of the drawings.

In the preferred method of using the apparatus forming the subject of this invention that end of the cable body 11 which is to be spliced is operated upon by a cable splicing mechanism 12 which is mounted on a stationary bench or table 13 or other support while the opposite end or body of the cable is held against turning by a holding device 14 which is arranged at a distance from the splicing mechanism and preferably also mounted on said bench. The device holding the body of the cable at a point remote from the splicing mechanism may be variously formed but preferably consists of an ordinary vise such as commonly used by mechanics for holding articles while the same are operated on.

Wire cables used in aircraft, hoisting apparatus, shipyards and the like are usually provided at the end of the body of the cable with a loop or bight 15 one side of which is a continuation of the body while the other side forms a short stub 10 the strands 16 of which are interwoven with the strands of the adjacent part of the body of the cable. Within this loop is arranged a thimble which receives the means whereby the cable is connected with some other part, which thimble may be either of pear-shape form, as shown at 17 in Figs. 1, 2 and 8, or in the form of a cylindrical bushing, as shown at 18 in Fig. 10.

The splicing mechanism forming the subject of this invention serves to hold the loop of the cable and the thimble therein in an assembled position while the splicing of the stub and body of the cable is effected.

In its preferred form this improvement is constructed as follows:

The numeral 19 represents a stationary standard upon which the movable parts of the splicing mechanism are mounted and which preferably has the form of an upright body or post having a flat underside which is adapted to rest with its lower end or base on top of the bench 13 adjacent to the front side thereof and provided at its lower end with vertical locating lugs 20 adapted to engage with the front side of the bench, as shown in Figs. 1, 2 and 5. By these means the standard cannot rest in a normal upright position on any part of the upper side of the bench excepting at an edge part of the bench and thus insures fastening the standard to the front part of the bench where the parts of the splicing mechanism are in the most convenient position for manipulation by the operator.

Various means may be employed for fastening the standard to the bench, such for example, as screws 21 passing through horizontal lugs 22 on the ends and rear side of the base portion of the standard and into the adjacent part of the bench.

On its upper end the standard is provided with a horizontal longitudinal bearing 23 of tubular or cylindrical form, the front and rear ends of which project beyond the corresponding parts of the standard, as shown in Figs. 1, 2 and 3.

Within this bearing is arranged a horizontal arbor or shaft 24 preferably of tubular form and which is capable of rotating therein so that the parts of the splicing mechanism which are carried by this shaft and which grip the loop and thimble of the cable may be turned into the desired positions best suited for the operator in performing the splicing operation of the cable. This shaft is so mounted in the bearing that the same is free to rotate but is held against lengthwise movement and capable of being removed from the bearing while the gripping mechanism carried thereby is still connected with the loop and thimble of the cable. This is preferably accomplished by a fixed collar 25 secured to the front end of the shaft by a screw joint 26 and a transverse pin 27 and engaging the front end of the bearing, and a stop collar 28 engaging with the rear end of the bearing and detachably secured to the rear end of the shaft by a fastening pin 29 passing crosswise through the shaft and the stop collar, as shown in Figs. 1, 2, 3 and 7.

Rotation of the shaft in the bearing may be regulated by a retarding or braking device which preferably consists in providing the front end of the tubular bearing with a slit 30 and laterally projecting lugs 31 on opposite sides of the slit and connecting these lugs by a clamping screw 32. By tightening this clamping screw more or less the split parts of the bearing may be pressed more or less firmly against the adjacent part of the shaft and thus control the freedom of rotation of the same accordingly, and also overcome the torque in the cable.

From the collar 25 a frame extends forwardly and upon this the means are mounted whereby the loop and thimble of the cable being spliced are mounted. This frame comprises two parallel plates one of which, 33, is preferably formed integrally with the front collar 25 of the shaft, while the other plate 34 is spaced from the fixed plate and detachably connected therewith by a pair of front bolts 35 connecting transversely opposite parts of the front ends of these plates and a pair of rear bolts 36 connecting the transversely opposite parts of the rear ends of said plates, as shown in Figs. 1, 2 and 3. These plates are held in spaced apart relation by means which include two tubular spacers or sleeves 37 surrounding the rear bolts between these plates. For the purpose of maintaining the two frame plates in alinement the same are interlocked by means which preferably consists of an alining lug 9 arranged on the rear end of the integral plate 33 and engaging with an alining recess 8 on the corresponding end of the detachable plate 34, as shown in Figs. 1, 2 and 3.

On transversely opposite sides of the longitudinal center line of this mechanism two gripping or clamping levers are arranged each of which has its rear part arranged between the frame plates adjacent to one side thereof while the front part of the same extends beyond the front end of the same. Each of these levers has a tubular hub 38 which is pivoted on one of the front frame bolts 35 and acts as a spacer between the adjacent parts of the frame plates, a relatively straight rear arm 39 arranged between the frame plates, and a curved front arm 40 arranged in front of these plates. At their front ends the front arms of the clamping levers are provided with opposing jaws 41 which are adapted to engage the outer side of the body and stub of the cable adjacent to the inner part of the thimble and press the same against the latter during the splicing operation. Although these jaws may be formed integrally with the clamping levers the same are preferably made separate therefrom and each jaw is pivoted at its rear end by a bolt 42 to the front end of the respective clamping lever and thus permit of automatic adjustment of each jaw in order to enable the full area of the front side or face of the jaw to engage with the cable and hold the same in proper engagement with the thimble. The face of each jaw is curved concavely crosswise of the jaw to fit the crosswise convexly curved surface of the cable, as shown in Fig. 9, and after the jaw has been adjusted to the desired position relative to the lever and cable the respective bolt 42 is tightened for holding these parts in position.

In the preferred construction the front end of each lever is forked and the rear end of the companion jaw is arranged in this fork and the adjacent parts of this jaw and lever engage each other by cooperating bearing surfaces 43, 44, formed concentrically on the jaw and lever, as shown in Fig. 2, thereby cooperating with the respective pivot bolt 42 in carrying the load of the pressure of the jaws against the cable.

When splicing a cable around a thimble which is comparatively large the jaws of the clamping levers are turned outwardly in order to properly engage the respective parts of the cable, as shown by full lines in Fig. 8, but when splicing a cable around a thimble of smaller size then the jaws are turned inwardly the requisite extent in order to compensate for the greater inward throw of the levers when splicing a cable around a smaller thimble, as shown by dotted lines in the same figure.

Adjustment of the clamping levers together with their jaws for adapting the latter to the loop of the cable on the thimble is effected by an adjusting screw 45 which is arranged transversely between the frame plates and provided on its opposite ends with right and left hand screw threads which work in screw nuts 46 pivoted or swiveled on the rear arms of the clamping levers.

Turning of the adjusting screw is effected by a finger piece 47 on one end thereof and longitudinal movement of this screw is prevented by a centering collar 48 arranged on the central part of this screw and engaging its upper and lower parts with longitudinal grooves 49 on the inner sides of the frame plates. Upon turning the adjusting screw in one direction the levers will be shifted so as to separate the clamping jaws and upon turning the adjusting screw in the opposite direction the clamping jaws will be moved inwardly toward each other and press the opposite sides of the cable loop against the corresponding sides of the thimble.

Preparatory to clamping the loop of the cable with the thimble therein the same are centered and supported in the proper location between the front arms and jaws of the clamping levers to suit the particular size and shape of the thimble and loop which surrounds the same. The means for accomplishing this centering in accordance with the present invention are constructed as follows:

The numeral 50 represents a supporting and gaging head arranged between the front arms of the clamping levers and provided on its front side with a crescent-shaped seat the central part of which is grooved, as shown at 51 in Figs. 2 and 4, and receives the curved rear side of the cable loop, and the marginal parts 52 of which on opposite sides of the groove engage with the curved edges of the thimble on opposite sides of the loop. For the purpose of more reliably retaining the loop and thimble in engagement with the seat of the supporting head, the latter is provided on its upper and lower sides with pairs of retaining horns or lugs 53 which project forwardly from this head adjacent to the laterally projecting edges thereon and overlap the under and upper sides of the loop and thimble on opposite sides of the center line of the same, thereby obtaining a strong grip on the thimble and preventing the same from getting loose.

The numeral 54 represents an adjusting rod which is arranged lengthwise between the rear parts of the clamping levers and has its front end connected with the rear side of the supporting head and provided at its rear end with a forwardly facing shoulder 55 while its central part is slidable in a guide lug 56 on the front part of the frame plate 33, as shown in Fig. 2. Upon the front threaded part of the adjusting rod is mounted a screw nut 57 which engages the front side of the guide lug 56 and upon the rear side of this rod between the shoulder 55 thereof and the rear side of this guide lug is mounted a helical spring 58. Upon turning the screw nut 57 in one direction the adjusting rod will be moved forwardly together with the parts mounted thereon and upon turning this screw nut in the opposite direction the resilience of the spring 58 will move the adjusting rod and parts associated therewith rearwardly thereby enabling the means for centering and supporting the loop of the cable and the thimble to be readily adjusted to suit the requirements of the splicing job in hand.

For the purpose of preventing the loop and thimble supporting and centering means from turning independently of the frame and the parts associated therewith, retaining means are provided which preferably consist of a transverse retaining bar having its central part secured to the rear part of the supporting head 50 by rivets 59 or other suitable fastenings and having its opposite ends 60 projecting laterally through guide slots 61 in the front arms of the clamping levers, as shown in Figs. 1, 2, 3 and 5. By these means the supporting head 50 and the parts connected therewith are free to move lengthwise of the frame and clamping levers for adjusting the head to suit a particular splicing operation, but this head is compelled to turn with the frame and clamping levers while effecting a splicing operation.

When splicing a cable for attaching its loop to a thimble or bushing 18 of cylindrical form, the clamping jaws 62 are constructed to fit the periphery of this particular form and the loop surrounding the same, as shown in Fig. 10.

In using this apparatus the shaft of the supporting frame is mounted on the standard 20 so as to be capable of rotation but held against lengthwise movement by inserting the pin 29 through collar 28 and shaft 24 while the latter is inserted in the bearing 23. The clamping levers are then shifted so as to separate their jaws sufficiently to permit the loop of the cable and the thimble therein to be inserted between the jaws. The centering means are now adjusted so that the loop and thimble upon being mounted on the centering or gaging head will be properly located for subsequently clamping the body and stub of the cable against opposite sides of the thimble or bushing preparatory to effecting the splicing operation.

In order to permit the strands of the stub and body of the cable to be spliced or interwoven the holding device which grips the loop of the cable is first turned backwardly a sufficient extent to untwist, open up or separate the strands of the cable body ajacent to the loop so that the strands of the stub can be inserted between or interlaced with those of the cable body. When the cable has been turned backwardly sufficiently for this purpose the same is held there by tightening the screw 32 of the brake or holding device. Upon successively loosening and tightening this screw the cable and the means which hold the loop and thimble, these parts may be turned intermittently for bringing all parts of the circumference of the cable into a position in which the operator can perform his work most conveniently. While turning the cable backwardly for untwisting its strands a torque is developed in the same so that when the screw 32 is loosened and the hold or brake on the cable is released the cable is turned forwardly due to the torque, resilience or recoil of the same and again winds up the strands of the cable body and interlocks the same firmly with the strands of the cable stub.

As a whole this instrument is very strong and durable and has no parts which are liable to get out of order and its use permits of quickly and easily splicing cables efficiently and economically.

I claim as my invention:

1. A cable splicer comprising a fixed standard adapted to be mounted on a stationary support and provided with a horizontal tubular bearing, and means for grasping the cable to be spliced including a horizontal shaft adapted to rotate in said bearing and having means for gripping said cable and means whereby said shaft is held against lengthwise movement in said bearing but permitted to turn therein, including a fixed collar permanently connected with one end of said shaft and engaging one end of said bearing, a detachable collar arranged on the opposite end of said shaft and engaging the opposite end of said bearing, and a removable fastening pin passing through the detachable collar and shaft.

2. A cable splicer comprising a rotatable frame having two spaced plates, and clamping levers arranged between said plates and pivoted thereto and provided with jaws adapted to grasp a cable.

3. A cable splicer comprising a rotatable frame, clamping levers pivoted on said frame and having jaws adapted to grasp a cable, and adjusting means for turning said levers relatively to each other.

4. A cable splicer comprising a rotatable frame, clamping levers pivoted on said frame and having front arms provided with jaws adapted to grasp a cable and also provided with rear arms, and means for moving said levers relatively to each other including an adjusting screw having right and left screw threads engaging correspondingly threaded screw nuts pivoted on the rear arms of said levers.

5. A cable splicer comprising a rotatable frame, clamping levers pivoted on said frame and having front arms provided with jaws adapted to grasp a cable and also provided with rear arms, screw nuts pivoted on the rear arms of said levers and having screw threads which receive the correspondingly threaded parts of said levers, and means for holding said adjusting screw against lengthwise movement but permitting rotation of the same.

6. A cable splicer comprising a rotatable frame, clamping levers pivoted on said frame and having front arms provided with jaws adapted to grasp a cable and also provided with rear arms, screw nuts pivoted on the rear arms of said levers and having screw threads which receive the correspondingly threaded parts of said levers, and means for holding said adjusting screw against lengthwise movement but permitting rotation of the same, including a collar arranged on said adjusting screw and engaging its periphery with a groove in said frame.

7. A cable splicer comprising a frame having parallel plates, spacers arranged between said plates, bolts connecting said plates and passing through said spacers, and clamping levers arranged between said plates and pivoted thereto and adapted to grasp the cable to be spliced.

8. A cable splicer comprising a frame, clamping levers pivoted on said frame, and jaws adjustably mounted on said levers and adapted to grasp the cable to be spliced.

9. A cable splicer comprising a frame, clamping levers pivoted on said frame, and adjustable jaws pivoted on said levers and adapted to grasp the cable to be spliced, each of said levers and the jaw pivoted thereon being provided with cooperating curved surfaces which are concentric with the respective pivot.

10. A cable splicer comprising a frame, clamping levers pivoted on said frame and provided with jaws adapted to engage opposite sides of a loop on the cable, and a gage head mounted on said frame and adapted to be engaged with the loop of the cable.

11. A cable splicer comprising a frame, clamping levers pivoted on said frame and provided with jaws adapted to engage opposite sides of a loop on the cable, a gage head mounted on said frame and adapted to be engaged with the loop of the cable, and horns arranged on said head and adapted to project over said loop.

12. A cable splicer comprising a frame, clamping levers pivoted on said frame and provided with jaws adapted to engage opposite sides of a loop on the cable, a gage head mounted on said frame and adapted to be engaged with the loop of the cable, and means for adjusting said head lengthwise between said levers.

13. A cable splicer comprising a frame, clamping levers pivoted on said frame and provided with jaws adapted to engage opposite sides of a loop on the cable, a gage head mounted on said frame and adapted to be engaged with the loop of the cable, and means for adjusting said head lengthwise between said levers, including a guide lug arranged on said frame, an adjusting rod slidable lengthwise in said lug and connected with said head, an adjusting screw nut arranged on said rod and engaging the front side of said lug, and a spring surrounding said rod and interposed between said lug and a shoulder on said rod.

14. A cable splicer comprising a frame, clamping levers pivoted on said frame and provided with jaws adapted to engage opposite sides of a loop on the cable, a gage head mounted on said frame and adapted to be engaged with the loop of the cable, and means for preventing said head from rotating relative to said levers but permitting longitudinal movement of the same relative thereto.

15. A cable splicer comprising a frame, clamping levers pivoted on said frame and provided with jaws adapted to engage opposite sides of a loop on the cable, a gage head mounted on said frame and adapted to be engaged with the loop of the cable, and means for preventing said head from rotating relative to said levers but permitting longitudinal movement of the same relative thereto, including bars projecting transversely from opposite sides of said head and movable lengthwise in longitudinal slots formed in said levers.

ISIDORE JACOEL.